United States Patent [19]

Matsuda et al.

[11] Patent Number: 5,773,073
[45] Date of Patent: Jun. 30, 1998

[54] WATER-IN-OIL EMULSION CONTAINING A POLYGLYCEROL FATTY ACID ESTER HAVING ERUCIC ACID AS THE MAIN FATTY ACID COMPONENT

[75] Inventors: Koji Matsuda, Tokyo; Miwako Kitao, Kanagawa, both of Japan

[73] Assignee: Mitsubishi Chemical Co., Ltd., Tokyo, Japan

[21] Appl. No.: 945,586

[22] Filed: Sep. 16, 1992

Related U.S. Application Data

[63] Continuation of Ser. No. 618,843, Nov. 28, 1990, abandoned.

[30] Foreign Application Priority Data

Nov. 28, 1989 [JP] Japan .................................. 1-308394

[51] Int. Cl.$^6$ ....................................................... A23D 7/00
[52] U.S. Cl. .......................... 426/602; 426/601; 426/603; 426/607; 426/611; 426/612
[58] Field of Search ..................................... 426/601, 602, 426/603, 604, 607, 611, 612

[56] References Cited

U.S. PATENT DOCUMENTS

| | | | |
|---|---|---|---|
| 3,914,458 | 10/1975 | Terada et al. | 426/604 |
| 3,939,290 | 2/1976 | Terada et al. | 426/602 |
| 4,160,850 | 7/1979 | Hallstrom et al. | 426/601 |
| 4,226,890 | 10/1980 | Howard | 426/613 |
| 4,363,763 | 12/1982 | Peterson | 426/603 |
| 4,368,213 | 1/1983 | Hollenbach et al. | 426/612 |
| 4,847,105 | 7/1989 | Yokobori et al. | 426/607 |

OTHER PUBLICATIONS

WPIL, Accession No. 85–253377 [41], Derwent Publications Ltd, London, GB, abstract of JP–A–60–168340 (Riken Vitamin Co. K.K.) 31 Aug. 1985.
WPIL, Accession No. 87–217580 [31], Derwent Publications Ltd, London, GB, abstract of JP–A–62–143637 (Miyoshi Yushi K.K.) 26 Jun. 1987.
JAPS/JPO abstract of JP–A–1–157342 (Asahi Denka Kogyo K.K.) 20 Jun. 1989.
WPIL, Accession No. 86–260821 [40], Derwent Publications Ltd, London, GB, abstract of JP–A–61–187795 (Daiichi Kogyo Seiyaku) 21 Aug. 1986.
WPIL Abstract of JP–A–62–143637.
WPIL Abstract of JP–A–56–8643.

*Primary Examiner*—Leslie Wong
*Attorney, Agent, or Firm*—Sughrue, Mion, Zinn, Macpeak & Seas, PLLC

[57] ABSTRACT

A water-in-oil emulsion having a high water content and an excellent emulsion stability. The water-in-oil emulsion contains a polyglycerol fatty acid ester the main constituting fatty acid component of which is erucic acid.

7 Claims, No Drawings

WATER-IN-OIL EMULSION CONTAINING A POLYGLYCEROL FATTY ACID ESTER HAVING ERUCIC ACID AS THE MAIN FATTY ACID COMPONENT

This is a continuation of application Ser. No. 07/618,845 filed Nov. 28, 1990 now abandoned.

FIELD OF THE INVENTION

This invention relates to a water-in-oil emulsion, and more particularly to a water-in-oil emulsion having a high water content and an excellent emulsion stability.

BACKGROUND OF THE INVENTION

Hitherto, the water content of margarines as water-in-oil emulsions is usually less than 22% as defined by the Nippon Agriculture and Forestry Standard but for specific purposes, for example, from the view point of dietetics, margarines having a high water content have been produced as low calorie margarine.

Also, water-in-oil butter cream, etc., have been produced by adding a syrup, etc., to shortening or margarine.

For stably obtaining a water-in-oil emulsion having a high water content, various kinds of emulsifier have been investigated but a satisfactory result has not yet been obtained. For example, a method of using a glycerol-condensed ricinoleic acid ester together with a polyglycerol unsaturated fatty acid ester as the emulsifier is known as disclosed in JP-A-62-143637 (the term "JP-A" as used herein means an "unexamined published Japanese patent application"). However, in the aforesaid method, a stable water-in-oil emulsion is not obtained when the solid fat content (hereinafter referred to as "SFC") at 20° C. of fat used is as high as 20% or more, or when the water content of the emulsion formed is very high as over 70% by weight, and especially when the above two conditions are met at the time. Furthermore, in the aforesaid method, there is an inconvenience in handling that two kinds of emulsifier each having a different property must be used together. The aforesaid patent application describes that when the polyglycerol unsaturated fatty acid ester is used alone, the emulsification is unstable and also the phase inversion from a water-in-oil type to an oil-in-water type is liable to occur, thereby the combined use of the aforesaid two kinds of the emulsifier is inevitable.

A method of using a monoglycerol ester of erucic acid and/or a sorbitan fatty acid ester is known as disclosed in JP-A-56-8643. However, according to the inventors' investigations on the aforesaid method, when the emulsion is rapidly cooled during the preparation process or when the emulsion is stored for a long period of time, water is liable to be separated from the emulsion and for avoiding such a trouble, use of a specific emulsifying apparatus is necessary.

A low calorie margarine has a form of a water-in-oil emulsion having a less content of fat and a larger water content than ordinary margarine. (The term either "fat" or "oil" used herein should be interpreted as being inclusive of solid fat, liquid oil and mixtures thereof, unless otherwise indicated.) Since the water content thereof is large, there is a problem in stability such that it is difficult to form a stable emulsion and during production and storage thereof, a phase separation (water separation phenomenon) of an aqueous phase from a fat phase occurs. If the proportion of the aqueous phase which is the dispersed phase is higher, the emulsion becomes more unstable and the emulsion is phase-transferred into an oil-in-water emulsion or the emulsification is liable to be broken.

Also, butter creams for making confectionery or breads, which are produced from processed fat, such as shortening, margarine, etc., have the structure of a water-in-oil emulsion. Accordingly, mouth feel is dominated by the melting point of the compounded fat, which is disadvantageous in that the taste of the aqueous phase is reluctant to perceive and the taste becomes oily.

When the water content is increased for improving the taste, or the fat content is decreased from the view point of dietetics, there occurs a difficulty that water separation occurs during the storage thereof.

A water-in-oil emulsion is generally stable when it contains certain ranges of a solid fat, a liquid oil, an emulsifier, and water. The reason is considered to be that the solid fat as a matrix stably holds water and the liquid oil. However, in an emulsion having a high SFC, the fat crystals are deposited at rapid cooling during the production process. Also, during the storage at low temperature (including room temperature), coarse fat crystals are deposited and they become large to make the emulsification unstable.

SUMMARY OF THE INVENTION

An object of this invention is to provide a water-in-oil emulsion having a high water content and an excellent emulsification stability.

It has now been discovered that the aforesaid object can be attained by using as an emulsifier a polyglycerol fatty acid ester the main constituting fatty acid component of which is erucic acid.

DETAILED DESCRIPTION OF THE INVENTION

The content of erucic acid in the fatty acid component constituting the polyglycerol fatty acid ester of this invention is at least 50% by weight and preferably at least 70% by weight.

If the content of erucic acid is less than 50% by weight, the effect of this invention is not substantially obtained. At long as the content of erucic acid is 50% by weight or more, other fatty acid(s) having 4 to 24 carbon atoms may be mixed, such as butyric acid, capric acid, lauric acid, myristic acid, palmitic acid, stearic acid, oleic acid, linoleic acid, linolenic acid, and gadoleic acid.

The condensation degree of glycerol (the polymerization degree of the polyglycerol component constituting the polyglycerol fatty acid ester) is required to be 2 or more, and is preferably selected in the range of from 4 to 12.

The mean esterification ratio of the poly-glycerol fatty acid ester gives influences on its emulsifying capacity and the stability of the resulting water-in-oil emulsion. The mean esterification ratio is usually from 30 to 90%, preferably from 50 to 85%, and more preferably from 70 to 80%. The term "esterification ratio" used herein means a percentage of the number of hydroxy groups in the polyglycerol esterified with the fatty acid based on the number of hydroxy groups of the polyglycerol before the esterification. If the esterification ratio is too low, there is a tendency of reducing the affinity of the ester for fat, and if the esterification ratio is too high, the lipophilicity is too strong and thus there is a tendency that the effect of this invention is reluctant to obtain.

That is, even when the main constituting fatty acid component is erucic acid, use of polyglycerol fatty acid esters having a very low esterification ratio or use of completely esterified polyglycerol fatty acid esters results in reduced effect of this invention. While the esterification ratio shows the extent of the hydroxy groups of the polyglycerol substituted by fatty acids as described above, such an esterification degree can also be defined in terms of hydroxyl value showing the extent of remaining free hydroxy groups. The hydroxyl value of the polyglycerol fatty acid of this invention is generally from 30 to 150 and preferably from 40 to 70. The "hydroxyl value" used herein is the value of mg of potassium hydroxide required to neutralize acetic acid which is required for acetylating the free hydroxy groups contained in one gram of a polyglycerol fatty acid ester. As the number of hydroxy groups remaining in the polyglycerol fatty acid ester decreases, the hydroxyl value is lower and thus the ester is more lipophilic.

The determination of the hydroxyl value is conducted according to the method 2.4.9.1-83 in the standard fat and oil analyzing test methods (established by the Oil Chemical Society of Japan). A polyglycerol fatty acid ester having the hydroxyl value of less than 30 has a too strong lipophilic property and the effect as an emulsifier is reduced. Also, if hydroxyl value is over 150, the affinity for fat is reduced to decrease the effect of this invention.

The polyglycerol fatty acid ester of this invention is obtained in the following manner. For example, glycerol is condensed in the presence of an alkali catalyst at a temperature of from 100° C. to 300° C. to provide polyglycerol. Then, the thus obtained polyglycerol is mixed with a fatty acid at a desired ratio without using solvent to directly estering the polyglycerol, in the presence of an alkali catalyst at a temperature of from 100° C. to 300° C.

For the fat which is a raw material constituting the main components of the fat phase in this invention, there is no restriction if it is edible, and examples thereof are vegetable fats such as soybean oil, rapeseed oil, palm oil, corn oil, cotton seed oil, coconut oil, palm kernel oil, etc.; animal fats such as beef tallow, lard, fish oil, milk fat, etc.; and those obtained by processing, such as fractionating, ester interchanging, hydrogenating, etc., of the aforesaid fats. These fats are used singly or as a mixture thereof.

It is preferable for the aforesaid raw material fat to have a fluidity to some extent or to be semisolid, namely having a melting point of from 10° C. to 40° C. or having SFC at 20° C. of from 5 to 35%. Since the aforesaid fat constitutes the dominant part of the fat phase of the emulsion which may contain additives, SFC of the fat phase of the emulsion may be the same as that of the fat used.

The melting point (m.p.) of fat and is measured by the open-tubed melting point measurement method 2.3.4.2-71 in the standard fat and oil analysis test methods (established by Oil Chemical Society of Japan).

The value of SFC was determined as in Example 1 shown below according to the method based on pulse NMR [see, *Journal of the American Oil Chemists' Society*, Vol. 55, No. 3, 328–331 (1978)].

In production of the water-in-oil emulsion of this invention, the polyglycerol fatty acid ester is added as an emulsifer generally in an amount of from 0.1 to 5% by weight, preferably from 0.5 to 3% by weight, based on the total amount of the emulsion. The addition of more than 5% by weight is undesirable from the points of cost and taste. If the amount thereof is less than 0.1% by weight, the marked effect of this invention is not realized. Also, if necessary, other edible emulsifiers, such as a sucrose fatty acid ester, a glycerol fatty acid ester, a propylene glycol fatty acid ester, a sorbitan fatty acid ester, lecithin, etc., can be used together with the emulsifier of this invention.

The water-in-oil emulsion having the weight ratio of the aqueous phase to the fat phase of from 30/70 to 90/10 and preferably from 50/50 to 80/20 can be stably produced according to this invention.

The water-in-oil emulsion of this invention can further contain, according to the purpose thereof, dairy products, saccharides, stabilizers, flavors, vitamins, colorants, etc. Also, the stability of the water-in-oil emulsion of this invention can be further increased by incorporating a pH controlling agent such as a polymerized phosphate, etc., or a charge controlling agent.

Furthermore, by using the emulsion of this invention with the emulsifier (water-in-oil)-in-water type or (oil-in-water)-in-oil type multiphase emulsions can be obtained.

An example of foods to which the water-in-oil emulsion of this invention is applied is butter cream. The butter cream is usually produced by mixing fat and the emulsifier, rapidly cooling the mixture to crystallize the fat, applying thereto a tempering operation (an operation of allowing to stand for from 1 to 3 days at a temperature of from 5° to 9° C. lower than the melting point of the fat or at a temperature showing SFC of from 8 to 13%) to control the crystal polymorphism, morphology, content, etc., of the solid fat, and thereafter, stirring the product together with syrup, sugar, egg, etc., while foaming.

Other examples of foods to which the present invention is applied are fat spread, low fat spread, etc. They are water-in-oil emulsions having a water content of at least 50%, and the fat phase thereof is formed by previously melting the emulsifier into the fat. More specifically, the emulsion is obtained by stirring an molten fat phase while adding thereto an aqueous phase and then cooling the emulsion. In this case, it is considered that the emulsifier functions to stabilize the interface between the fat and the water.

The invention is further described in more detail with reference to the following examples but the invention should not be construed as being limited thereto. In these examples, all "%" and "parts", are by weight, unless otherwise indicated.

Production Example of Polyglycerol Fatty Acid Ester (Hereinafter, Referred to as PGE)

After reacting glycerol for 6 hours at 270° C. in the presence of sodium hydroxide as a catalyst, the product was purified by a molecular distillation (100° C., $10 \times 10^{-3}$ mmHg) to provide hexaglycerol having a mean condensation degree of 6. Then, a fatty acid mixture of 90% erucic acid and other 10% fatty acids (i.e., 5% oleic acid, 3% linoleic acid and 2% of gadoleic acid) was reacted with hexaglycerol in an amount of 6 mols per mol of hexaglycerol. The reaction was carried out for one hour at 230° C. in the presence of lithium chloride as a catalyst.

The mean esterification ratio of the thus obtained PGE was about 75% and the hydroxyl value thereof was 55.

The product thus obtained is hereinafter called "hexaglycerol hexaerucic acid ester". Similarly, a product produced by changing the mol number of fatty acids to the polyglycerol is named in the same manner. That is, the PGE in this invention is named referring to 1) polymerization degree of the polyglycerol component and 2) mole number of the fatty acid component to one mole of the polyglycerol component.

Various kinds of polyglycerol fatty acid esters produced by the similar manners as above are shown in Table 1 below, together with each reaction condition. In Table 1, the terms "$C_{22}$, 90%", "$C_{18}$, 70%" "Others, 10%", and "Others, 30%"

under the column "Fatty Acid Composition" have the following meanings:

$C_{22}$, 90%: 90% Erucic acid $C_{18}$, 70%: 70% Oleic acid

Others, 10%: 5% Oleic acid+3% Linoleic acid+2% Gadoleic acid

Others, 30%: 4% Myristic acid+15% Palmitic acid+2% Stearic acid+9% Linoleic acid for 2 minutes. Then, a part of the cooled emulsion was placed in a 100 ml-test tube, and stored at 15° C. or 25° C. to observe the emulsification stability (existence of phase separation) with the passage of time.

The results obtained are shown in Table 2 below.

SFC of the fat used was measured by the method based on the pulse NMR shown below.

TABLE 1

| | Condition | | | | Polyglycerol Fatty Acid Ester | | |
|---|---|---|---|---|---|---|---|
| | Glycerol Reaction Condition | | Mean Condensation | Mol Number of Fatty | Fatty | | Mean Esterification |
| | Temperature (°C.) | Time (hr.) | Degree of Glycerol | Acid to Polyglycerol | Acid Composition | Name | cation (%) | Hydroxyl Value |
| Production Example 1 | 270 | 6 | 6 | 6 | $C_{22}$, 90% Others 10% | Hexaglycerol Hexaerucic Acid Ester | 75 | 55 |
| Production Example 2 | 270 | 6 | 6 | 4 | $C_{22}$, 90% Others 10% | Hexaglycerol Tetraerucic Acid Ester | 50 | 130 |
| Production Example 3 | 270 | 6 | 6 | 2 | $C_{22}$, 90% Others 10% | Hexaglycerol Dierucic Acid Ester | 25 | 230 |
| Production Example 4 | 270 | 6 | 6 | 7 | $C_{22}$, 90% Others 10% | Hexaglycerol Heptaerucic Acid Ester | 92 | 22 |
| Production Example 5 | 270 | 6 | 6 | 6 | $C_{18}$, 70% Others 30% | Hexaglycerol Hexaoleic Acid Ester | 75 | 50 |
| Production Example 6 | 270 | 8 | 10 | 10 | $C_{22}$, 90% Others 10% | Decaglycerol Dedaerucic Acid Ester | 83 | 50 |
| Production Example 7 | 270 | 8 | 10 | 6 | $C_{22}$, 90% Others 10% | Decaglycerol Hexaerucic Acid Ester | 50 | 120 |
| Production Example 8 | 270 | 8 | 10 | 11 | $C_{22}$, 90% Others 10% | Decaglycerol Undecaerucic Acid Ester | 92 | 22 |
| Production Example 9 | 270 | 8 | 10 | 2 | $C_{22}$, 90% Others 10% | Decaglycerol Dierucic Acid Ester | 17 | 220 |
| Production Example 10 | 270 | 8 | 10 | 9 | $C_{18}$, 70% Others 30% | Decaglycerol Nonaoleic Acid Ester | 75 | 55 |
| Production Example 11 | 270 | 8 | 10 | 7 | $C_{18}$, 70% Others 30% | Decaglycerol Heptaoleic Acid Ester | 58 | 104 |

EXAMPLE 1 AND COMPARATIVE EXAMPLE 1

(water-in-oil emulsion test)

Production Method and Evaluation Method of Water-In-Oil Emulsion:

Hydrogenated soybean oil (m.p.: 34° C., SFC at 20° C.: 30%) and an emulsifier were mixed at 60° C. such that the content of the emulsifier(s) was 1% based on the amount of the resulting emulsion shown below. In the case of using a mixture of two emulsifiers (Example d), the mixing ratio of the two emulsifier was 1:1 by weight.

Then, water was added dropwise to the aforesaid mixture at a rate of about 100 ml/min. under stirring at 8,000 r.p.m. by mean of a T.K. autohomomixer (sold by Tokushu Kika Kogyo Co., Ltd.) until the aqueous phase/fat phase ratio (hereinafter, referred to as W/O ratio) became 60/40 or 75/25. Thereafter, the mixture was further stirred for 3 minutes.

The emulsion obtained was cooled to from about 15° C. to 20° C. in an ice-water bath of 0° C. followed by stirring A sample was previously melted by heating to 60° C. and placed in a test tube for measurement. Then, the sample was kept for 30 minutes at 0° C., for 30 minutes at 26.7° C., and then for 30 minutes at 0° C. The temperature of the sample was raised from 0° C. to 60° C. with a temperature interval of 5° C. while keeping at each temperature for 30 minutes, and conducting the measurement of the pulse NMR. SFC at T° C. is calculated by the following formula.

$$SFC(\%) = 100 - \frac{\text{reference oil at } 60° \text{ C.}}{\text{sample at } 60° \text{ C.}} \times \frac{\text{sample } T° \text{ C.}}{\text{reference oil at } T° \text{ C.}} \times 100$$

As the reference oil (standard liquid oil), olive oil having SFC of 0 at 0° C. to 60° C. was used.

TABLE 2

| | | W/O ratio*5 and Emulsification Stability Evaluation with the Passage of Time*6 | | | | | |
|---|---|---|---|---|---|---|---|
| | | W/O = 60/40 | | | W/O = 75/25 | | |
| | Emulsifier | (A) | (B) | (C) | (A) | (B) | (C) |
| Example a | Decaglycerol undecaerucic acid ester (Production Example 8) | ◉ | ◉ | o | ◉ | ◉ | o |
| Example b | Decaglycerol hexaerucic acid ester (Production Example 7) | ◉ | ◉ | o | o | o | Δ |
| Example c | Hexaglycerol hexaerucic acid ester (Production Example 1) | ◉ | ◉ | o | ◉ | o | Δ |
| Example d | Decaglycerol undecaerucic acid ester (Production Example 8) and sucrose fatty acid ester*1 | ◉ | ◉ | o | ◉ | ◉ | o |
| Comparative Example a | Decaglycerol nonaoleic acid ester (Production Example 10) | x | x | x | x | x | x |
| Comparative Example b | Decaglycerol heptaoleic acid ester (Production Example 11) | o | Δ | x | Δ | x | x |
| Comparative Example c | Hexaglycerol hexaoleic acid ester (Production Example 5) | Δ | Δ | x | x | x | x |
| Comparative Example d | PGPR*2 | Δ | Δ | Δ | x | x | x |
| Comparative Example e | Glycerol monooleic acid ester*3 | x | x | x | x | x | x |
| Comparative Example f | Glycerol dierucic acid ester*4 | x | x | x | x | x | x |

(A): Immediately after cooling.
(B): After 1 week at 15° C..
(C): After 1 week at 25° C..
*1:Sucrose fatty acid ester, "ER-290", trade name, sold by Mitsubishi Kasei Shokuhin K.K.
*2:Polyglycerol condensed ricinoleic acid ester "PR-100", trade name, sold by Riken Vitamin K.K.
*3:Glycerol monooleic acid ester, "Emulgee MO", trade name, sold by Riken Vitamin K.K.
*4:Glycerol dierucic acid ester, "Sunsoft No. 533", trade name, sold by Taiyo Kagaku K.K.
*5:W/O shows the weight ratio of an aqueous phase to an fat phase. W means an aqueous phase and O means an fat phase.
*6:The signs for the emulsification stability evaluation shown in the table are as follows: ◉: Very stable o: Stable Δ: Slightly separated x: Completely separated.

EXAMPLE 3

(emulsifying capacity test)

After mixing 100 parts of a mixed oil (m.p. 34° C.) of rapeseed oil and palm oil and 1 part of the emulsifier shown in Table 3 below, the resultant mixture was heated to 60° C. until dissolved. After flowing the mixture into a stainless steel vat placed on ice to rapidly cool and plasticize, the mixture was stored for 2 days at 25° C. Then, 180 g of the aforesaid mixture was stirred with a KENMIX mixer (sold by KODAIRA CO., LTD.) for 40 minutes. Water was then added thereto at 20 ml/min. with stirring until the resulting water-in-oil emulsion could no longer be kept stable and the fat became immiscible with water. The maximum amount of water capable of being maintained in the form of a water-in-oil emulsion was calculated by the following formula and it was designated as a water absorption index.

Water absorption index=A(g)/B(g)×100

A: Amount of absorbed water
B: Amount of fat

The results obtained are shown in Table 3 below.

TABLE 3

| Emulsifier | Water Absorption Index |
|---|---|
| Hexaglycerol Hexaerucic Acid Ester (Production Example 1) | 800 |
| Hexaglycerol Tetraerucic Acid Ester (Production Example 2) | 650 |
| Hexaglycerol Dierucic Acid Ester (Production Example 3) | 50 |
| Hexaglycerol Heptaerucic Acid Ester (Production Example 4) | 110 |
| Decaglycerol Decaerucic Acid Ester (Production Example 6) | 900 |
| Decaglycerol Hexaerucic Acid Ester (Production Example 7) | 780 |
| Decaglycerol Undecaerucic Acid Ester (Production Example 8) | 80 |
| Decaglycerol Dierucic Acid Ester (Production Example 9) | 80 |

As is clear from the results shown in Tables 1 to 3, in the cases of using the polyglycerol erucic acid esters of this invention, both the emulsifying capacity and the effect of forming a stable water-in-oil emulsion are remarkable.

According to this invention, the emulsification stability of the water-in-oil emulsion having a high water content during production or storage of the emulsion can be greatly improved. Thus, the water-in-oil emulsion of this invention can be suitably applied to foods such as low calorie margarine, butter cream, etc.

While the invention has been described in detail and with reference to specific embodiments thereof, it will be apparent to one skilled in the art that various changes and modifications can be made therein without departing from the spirit and scope thereof.

What is claimed is:

1. A water-in-oil emulsion comprising an aqueous phase and a fat phase in a weight ratio of the aqueous phase to the fat phase of from 50/50 to 80/20 and containing a polyglycerol fatty acid ester which is added to the fat phase in an amount of from 0.1 to 5% by weight based on the total amount of the emulsion, which has erucic acid accounting for at least 70% by weight of its fatty acid component, and which has a mean esterification ratio of from 30 to 90%.

2. The water-in-oil emulsion of claim 1, wherein the condensation degree of polyglycerol component constituting the polyglycerol fatty acid ester is from 2 to 12.

3. The water-in-oil emulsion of claim 1, wherein the hydroxyl value of the polyglycerol fatty acid ester is from 30 to 150.

4. The water-in-oil emulsion of claim 1, wherein the solid fat content of the water-in-oil emulsion is from 5 to 35% at 20° C.

5. The water-in-oil emulsion of claim 1, wherein the melting point of the fat phase of the water-in-oil emulsion is from 10° to 40° C.

6. The water-in-oil emulsion of claim 1, which further contains at least one compound selected from the group consisting of a sucrose fatty acid ester, a glycerol fatty acid ester, a propylene glycol fatty acid ester, a sorbitan fatty acid ester, and lecithin.

7. The water-in-oil emulsion of claim 1, wherein the mean esterification ratio of the polyglycerol fatty acid ester is from 50 to 85%.

* * * * *